G. H. & E. D. GUDEBROD.
DENTAL FLOSS.
APPLICATION FILED JULY 19, 1918.

1,285,988. Patented Nov. 26, 1918.

WITNESSES

INVENTORS
George H. Gudebrod
Edward D. Gudebrod
BY
ATTORNEYS

UNITED STATES PATENT OFFICE.

GEORGE H. GUDEBROD, OF NEW YORK, N. Y., AND EDWARD D. GUDEBROD, OF POTTSTOWN, PENNSYLVANIA, ASSIGNORS TO GUDEBROD BROS. SILK CO., OF NEW YORK, N. Y., A CORPORATION OF NEW YORK.

DENTAL FLOSS.

1,285,988.      Specification of Letters Patent.      Patented Nov. 26, 1918.

Application filed July 19, 1918. Serial No. 245,716.

*To all whom it may concern:*

Be it known that we, GEORGE H. GUDEBROD, a citizen of the United States, and a resident of the city of New York, borough of Manhattan, in the county and State of New York, and EDWARD D. GUDEBROD, a citizen of the United States, and a resident of Pottstown, in the county of Montgomery and State of Pennsylvania, have invented a new and Improved Dental Floss, of which the following is a full, clear, and exact description.

The object of the invention is to provide a new and improved dental floss which is exceedingly strong and durable and adapted to be passed between the teeth or drawn over the surface of the teeth for the purpose of effectively removing extraneous matter or cleaning the teeth. Another object is to provide a dental floss with a polishing powder therein to act as a file with a view to facilitate the removal of extraneous matter and the polishing of the teeth.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1:
Figure 1 is a plan view of one of the sets of parallel threads used in the manufacture of the dental floss.
Figure 2:
Fig. 2 is a similar view of the set of threads twisted together.
Figure 3:
Fig. 3 is a face view of the braid forming the body of the dental floss.
Figure 4:
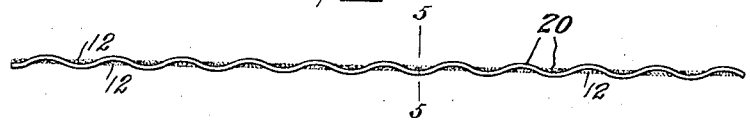
Fig. 4 is an enlarged edge view of the dental floss.
Figure 5:
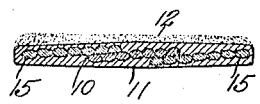
Fig. 5 is an enlarged cross section of the same on the line 5—5 of Fig. 4.

The dental floss in its finished state consists essentially of a braided body 10 of textile material inclosed in a covering 11 of wax, paraffin or similar material, and a polishing powder 12 adhering to the wax covering. In manufacturing the dental floss use is made of sets of threads 15 of silk or other material (see Fig. 1), the threads in each set being twisted together to form a strand 16, as shown in Fig. 2. Preferably three sets of strands are braided together to form the braided body 10 (see Fig. 3) which is next provided with the covering 11 of wax applied in a hot state. The body 10 and its covering 11 are next passed between a pair of ribbed rollers to flatten the body and its covering and to provide the same with transverse corrugations 20, as shown in Fig. 4. The polishing powder is next applied to the dental floss and adheres to the wax in the pockets formed by the corrugations, as will be readily understood by reference to Figs. 4 and 5.

The dental floss shown and described can be readily passed between the teeth or drawn over the surfaces of the teeth to effectually remove extraneous matter and to clean and polish the teeth, especially as the polishing powder 12 becomes very effective and greatly facilitates the removal of the extraneous matter and the polishing of the teeth.

Having thus described our invention, we claim as new and desire to secure by Letters Patent:—

1. A dental floss, comprising sets of threads, the threads in each set being twisted together and the sets being braided together and forming a thin flat braid, the braid being minutely corrugated transversely, a covering of wax for the said braid, and a polishing powder adhering to the said wax covering in the pockets formed by the corrugations.

2. A dental floss, comprising a flat braid having transverse corrugations, a covering for the braid, and a polishing powder adhering to the said covering in the pockets formed by the corrugations.

GEORGE H. GUDEBROD.
EDWARD D. GUDEBROD.